United States Patent
Cho et al.

(10) Patent No.: US 11,641,799 B2
(45) Date of Patent: May 9, 2023

(54) BLADE PROTECTION COVER AND LAWN MOWER APPARATUS INCLUDING THE SAME

(71) Applicant: LG ELECTRONICS INC., Seoul (KR)

(72) Inventors: Kyeongho Cho, Seoul (KR); Hanshin Kim, Seoul (KR); Siyong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 198 days.

(21) Appl. No.: 17/150,111

(22) Filed: Jan. 15, 2021

(65) Prior Publication Data

US 2021/0307245 A1    Oct. 7, 2021

(30) Foreign Application Priority Data

Apr. 1, 2020   (KR) .................. 10-2020-0039799

(51) Int. Cl.
| | |
|---|---|
| *A01D 34/82* | (2006.01) |
| *A01D 75/20* | (2006.01) |
| *A01D 101/00* | (2006.01) |

(52) U.S. Cl.
CPC .......... *A01D 34/828* (2013.01); *A01D 75/20* (2013.01); *A01D 2101/00* (2013.01)

(58) Field of Classification Search
CPC .... A01D 75/20; A01D 34/828; A01D 34/733; A01D 34/73; A01D 34/001; A01D 34/736; A01D 34/82; A01D 75/18; A01D 75/206; B26D 7/22; B26B 29/025
See application file for complete search history.

(56) References Cited

U.S. PATENT DOCUMENTS

| 7,481,256 | B2 | 1/2009 | Sayers | |
|---|---|---|---|---|
| 2018/0311838 | A1* | 11/2018 | Lee | .......................... B26B 29/02 |
| 2019/0224875 | A1* | 7/2019 | Rodal | ....................... B26B 3/00 |
| 2020/0128730 | A1* | 4/2020 | Nakano | .................. A01D 34/73 |
| 2020/0305346 | A1* | 10/2020 | Matsuzawa | ............... B26B 3/00 |

FOREIGN PATENT DOCUMENTS

| DE | 102015113295 A1 | 2/2017 |
|---|---|---|
| EP | 3 342 270 A1 | 7/2018 |
| EP | 3646698 A1 | 5/2020 |
| JP | 8-332286 A | 12/1996 |
| KR | 20-0459526 Y1 | 3/2012 |
| WO | WO2020/192173 A1 | 10/2020 |

OTHER PUBLICATIONS

Office Action in Australian Appln. No. 2020294262, dated Sep. 16, 2021 (7 pages).
European Search Report for Application No. 21151360.1, dated Jun. 9, 2021 (7 pages).

* cited by examiner

*Primary Examiner* — Thomas B Will
*Assistant Examiner* — Julia C Tran
(74) *Attorney, Agent, or Firm* — Birch, Stewart, Kolasch & Birch, LLP

(57) ABSTRACT

A blade protection cover coupled to a blade of a lawn mower apparatus includes a first cover for covering one face of the blade and two second covers connected to the first cover. The two second covers cover two edges of the blade in a width direction of the blade. Two guides are disposed on inner faces of the two second covers. The two guides are configured to guide the blade protection cover to slide along the two edges in the width direction of the blade.

10 Claims, 7 Drawing Sheets

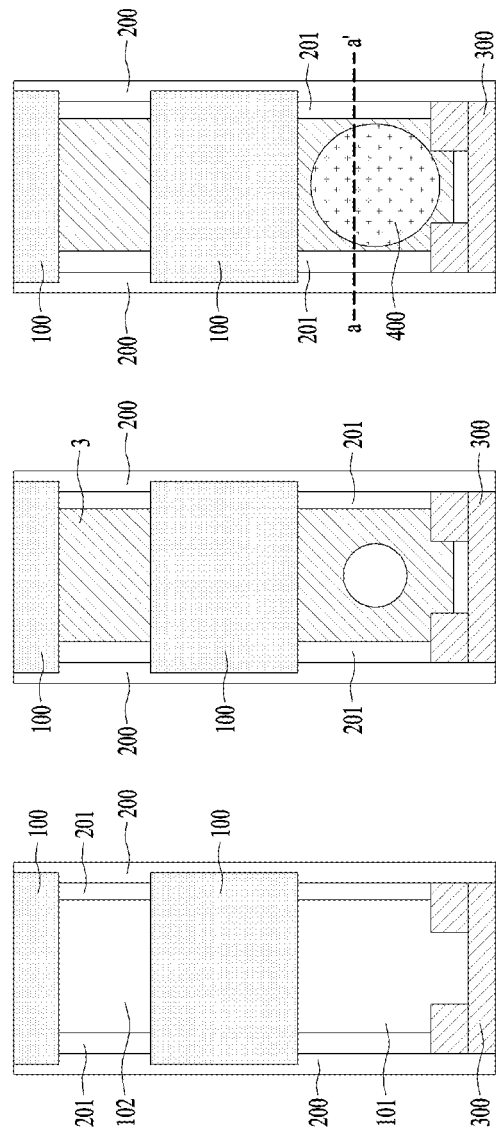

BLADE PROTECTION COVER AND LAWN MOWER APPARATUS INCLUDING THE SAME

This application claims the benefit of Korean Patent Application No. 10-2020-0039799, filed on Apr. 1, 2020, the contents of which are hereby incorporated by reference in their entirety.

BACKGROUND

Field

The present disclosure relates to a lawn mower apparatus with a protection cover that prevents a blade for mowing a lawn from being exposed to an outside.

Discussion of the Related Art

A lawn mower apparatus is configured for mowing lawns in a house yard or playground. The lawn mower apparatus may be classified into a household type used in a house and a tractor type used in a large playground or farm.

The household type lawn mower apparatus includes a walk behind type apparatus behind which a person drives the apparatus to mow the lawn, and a hand type apparatus that a person carries by hand.

The lawn mower apparatus mows the lawn to have a constant height. Lawn mowing means is a blade located at a bottom of the apparatus. A rotatable plate is disposed in a lower region of the lawn mower apparatus, and at least one blade is rotatably coupled to an edge of the rotatable plate. The rotatable plate rotates upon receiving a driving force from a driver, and thus the blade on the edge of the rotatable plate functions to mow the lawn.

A cover forming an appearance of the lawn mower apparatus covers the blade and the rotatable plate. Therefore, the blade is not exposed to an outside while mowing the lawn. However, the blade of the apparatus may be exposed when initially producing the apparatus, when replacing a blade with a new blade, when carrying the apparatus, and when maintaining the apparatus. Thus, there is a risk of injury to an user due to the exposed blade.

In U.S. Pat. No. 4,306,600, one blade is covered with two parts, and the two parts are connected to each other via a connector, thereby prevents exposure of the blade to the outside. However, the two parts must be inserted into the blade one by one and the connector must be used to connect the two parts, thereby to cause user inconvenience. Further, when one part is lost, the protection is not realized.

Further, in U.S. Pat. No. 7,481,256, a foldable cover wraps a blade to prevent exposure of the blade to the outside. However, it is difficult for a user to mount and remove the cover when the blade is coupled to a main body.

SUMMARY

A purpose of the present disclosure is basically to solve the problem of the conventional lawn mower apparatus as mentioned above.

A purpose of the present disclosure is to provide a lawn mower apparatus including a protection cover that covers a lawn mower blade, thus preventing an user from being injured by the blade.

Further, a purpose of the present disclosure is to provide a lawn mower apparatus having a structure of a protection cover that may be easily mounted on a blade.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

In order to achieve the above purpose, a lawn mower apparatus according to embodiments may include a protection cover that may protect the user from a cutting edge of a blade to mow the lawn. The protection cover covers both cutting edges in a width direction of the blade.

In one embodiment, a blade protection cover may be coupled to a blade of a lawn mower apparatus. The blade protection cover may include a first cover for covering one face of the blade; and two (both) second covers connected to the first cover, the both second covers covering both edges in a width direction of the blade respectively. Both guides may be disposed on inner faces of the both second covers respectively. The both guides may be constructed to guide the blade protection cover to slide along both edges in the width direction of the blade and thus to be coupled to the blade.

In one embodiment, the blade may be fixed to a rotatable plate of the lawn mower apparatus via a screw passing through one end in a longitudinal direction of the blade. the blade protection cover may further comprise a third cover for covering an edge of one end in the longitudinal direction of the blade.

In one embodiment, the blade may be rotatably coupled to the rotatable plate via the screw. The blade protection cover may cover the blade.

In one embodiment, the second cover may include both protrusions protruding from inner faces of the both second covers respectively. The protrusions and the third cover come into contact with the screw, thereby limiting sliding movement of the blade protection cover.

In one embodiment, each of the both second covers includes projections. The projections are arranged on and along both an outer face of each second cover. The projections are arranged along a sliding direction of the blade protection cover.

In one embodiment, while the blade protection cover covers the blade, the first cover has a first open face for exposing the screw securing the blade to the rotation plate.

In one embodiment, while the blade protection cover covers the blade, the first cover has a second open face for exposing the other end in the longitudinal direction of the blade.

A lawn mower apparatus may include a body including a driver; a rotatable plate connected to the driver and rotatably mounted on one face of the body; a blade rotatably connected to an edge of the rotatable plate; and a blade protection cover removably coupled to the blade. The blade protection cover may include a first cover for covering one face of the blade; and both second covers connected to the first cover, the both second covers covering both edges in a width direction of the blade respectively. Both guides may be disposed on inner faces of the both second covers respectively. The both guides may be constructed to guide the blade protection cover to slide along both edges in the width direction of the blade and thus to be coupled to the blade.

In one embodiment of the lawn mower apparatus, the blade may be fixed to a rotatable plate of the lawn mower apparatus via a screw passing through one end in a longitudinal direction of the blade. the blade protection cover may further comprise a third cover for covering an edge of one end in the longitudinal direction of the blade.

In one embodiment of the lawn mower apparatus, the blade may be rotatably coupled to the rotatable plate via the screw. The blade protection cover may cover the blade.

In one embodiment of the lawn mower apparatus, the second cover may include both protrusions protruding from inner faces of the both second covers respectively. The protrusions and the third cover come into contact with the screw, thereby limiting sliding movement of the blade protection cover.

In one embodiment of the lawn mower apparatus, each of the both second covers includes projections. The projections are arranged on and along both an outer face of each second cover. The projections are arranged along a sliding direction of the blade protection cover.

In one embodiment of the lawn mower apparatus, while the blade protection cover covers the blade, the first cover has a first open face for exposing the screw securing the blade to the rotation plate.

In one embodiment of the lawn mower apparatus, while the blade protection cover covers the blade, the first cover has a second open face for exposing the other end in the longitudinal direction of the blade.

The features of the above-described implantations may be combined with other embodiments as long as they are not contradictory or exclusive to each other.

Effects of the present disclosure are as follows but are limited thereto:

In accordance with the present disclosure, the blade of the lawn mower apparatus may be prevented from being exposed to the user during work or transportation. Further, the user may easily mount the protection cover on the blade.

The protection cover may be slidably mounted on the side face of the blade. Irrespective of whether the blade is attached to the rotatable plate or the blade is detached from the rotatable plate, the protection cover may be mounted on the blade without changing the coupling state between the plate and the blade.

The protection cover may be mounted to the blade in a state when the blade is fixed to the rotatable plate. The protection cover may be mounted to the blade in a state when the blade is separated from the rotatable plate. The blade with the protection cover attached thereto may be installed on the rotatable plate.

Further, while the protection cover is mounted on the blade, the rotatable plate may be rotated while driving the lawn mower apparatus. In this case, there is a risk that the protection cover is removed from the blade due to the rotational force. According to the present disclosure, the protection cover may be fixed to the blade via the protrusions, and thus the possibility of the removal may be prevented.

Effects of the present disclosure are not limited to the above effects. Those skilled in the art may readily derive various effects of the present disclosure from various configurations of the present disclosure.

BRIEF DESCRIPTION OF DRAWINGS

FIGS. 4A-4C and FIGS. 5A-5B are top views and cross-sectional views showing that a blade and a screw is coupled to a protection cover.

DETAILED DESCRIPTION

Figures 1A, 1B:
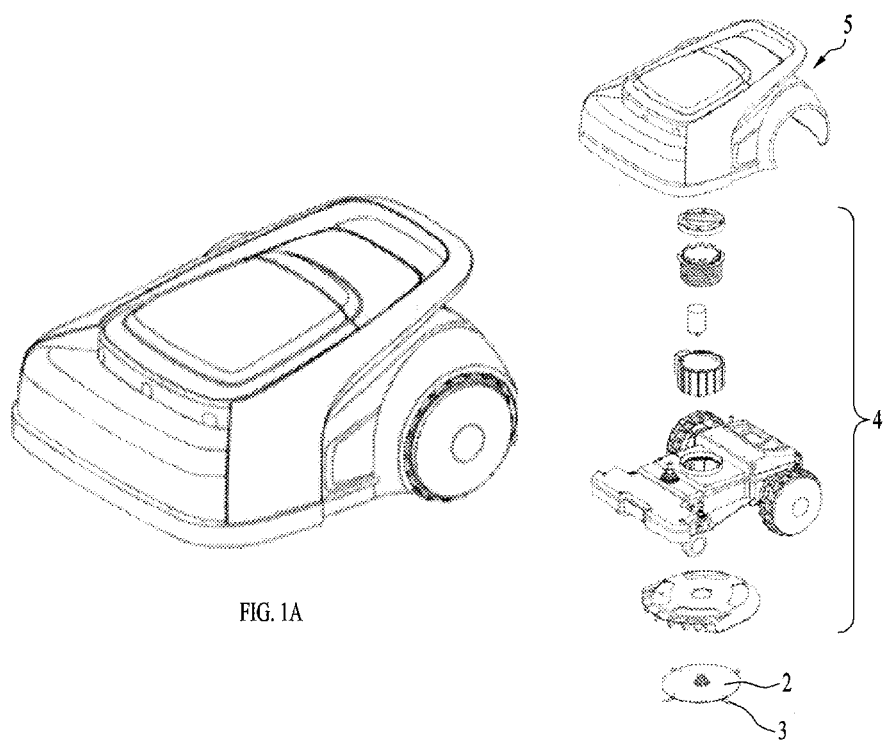
FIGS. 1A and 1B are a perspective view and an exploded view showing an appearance and a structure of a lawn mower apparatus according to the embodiments.

For simplicity and clarity of illustration, elements in the figures are not necessarily drawn to scale. The same reference numbers in different figures denote the same or similar elements, and as such perform similar functionality. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A lawn mower apparatus may be largely composed of an outer frame 5 and a body 4.

The outer frame 5 is installed to wrap an outside of the body 4 and forms an appearance of the apparatus. The outer frame 5 receives therein the body 4 and a blade 3 rotating at high speed. The outer frame 5 may prevent a user from being injured in rotation of the blade 3. A gap having an appropriate vertical dimension may be defined between a bottom of the outer frame 5 and a ground, according to a safety standard. When the gap vertical dimension is too large, a hand or a foot of the user may enter an interior of the outer frame 5, thereby to cause fatal injury. To the contrary, when the gap vertical dimension is too small, a load increases when mowing the lawn.

A transport handle (not shown) may be disposed on a top of the outer frame 5. The handle (not shown) is installed so that the blade 3 located on a bottom face of the body 4 is opposite to the user when holding the handle and lifting the lawn mower.

A rotatable plate 2 is installed on a bottom face of the body 4. At least one blade 3 may be coupled to the rotatable plate 2. As the rotatable plate 2 rotates, the blade 3 located on an edge of the rotatable plate 2 functions to mow the lawn.

The blade 3 is rotatably mounted onto the edge of the rotatable plate 2. At least two blades 3 may be arranged and be spaced apart from each other along a circumferential direction of the rotatable plate 2. In one example, the number of blades 3 may be 4. However, the present disclosure is not limited thereto.

When the rotatable plate 2 rotates, each blade 3 may radially be extended using a centrifugal force. Further, when the rotatable plate 2 stops, the blade 3 may be folded toward a center of a circle defined by the rotatable plate 2.

The blade 3 is not exposed to the outside while mowing the lawn. However, when producing the lawn mower apparatus, when replacing the blade, when carrying the apparatus, and when repairing or managing the apparatus, the blade of the apparatus may be exposed to the outside. The exposed blades may cause injury to the user. The lawn mower apparatus for solving the problem may include a protection cover 1 surrounding a cutting edge of the blade 3.

FIG. 1A is a perspective view showing an appearance of the lawn mower apparatus according to the embodiments. The outer frame defines an outer portion of the lawn mower apparatus. The carrying handle (not shown) may be mounted on a top of the outer frame.

Further, FIG. 1B is an exploded view showing a structure of the lawn mower apparatus including the outer frame 5, the body 4, the rotatable plate 2 and the blade 3 according to embodiments.

The lawn mower apparatus according to the embodiments may include the body 4 including the driver, the rotatable plate 2 connected to the driver and disposed on one face of the body 4, and the blade 3 rotatably disposed on the circumferential edge of the rotatable plate 2.

Specifically, the body 4 may be received in the outer frame 5. The body 4 may include the driver driven by a motor. The motor for driving the driver is connected to the rotatable plate 2 disposed on one face of the body 4. The rotatable plate 2 may be rotated upon receiving power from the motor. The rotatable plate 2 includes at least one blade 3 on the edge thereof. When rotating the rotatable plate 2, the blade 3 may be extended radially and functions to mow the lawn to have a certain height.

Further, the body 4 may include wheels (not shown). The lawn mower apparatus may move when the wheels at both ends of the body 4 rotate. The lawn mower apparatus may mow the lawn while traveling along a predetermined path and/or a path generated in real time.

When the rotatable plate 2 rotates, the blade 3 may be extended in a radial direction of the rotatable plate 2. Thus, the extended blade 3 may cause injury to the user. For this region, the outer frame 5 should cover both of the body 4 and the blade 3. Further, a distance between the outer frame 5 and the ground should be a suitable value that enables efficient traveling of the lawn mower apparatus without causing the injury to the user.

Figure 2A:
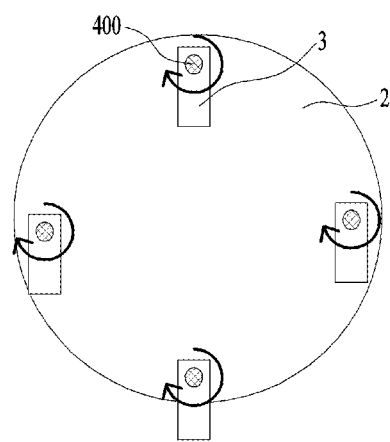
FIGS. 2A and 2B are cross-sectional views showing that a blade and a protection cover is rotatably coupled to a rotatable plate according to embodiments.
Figure 2B:
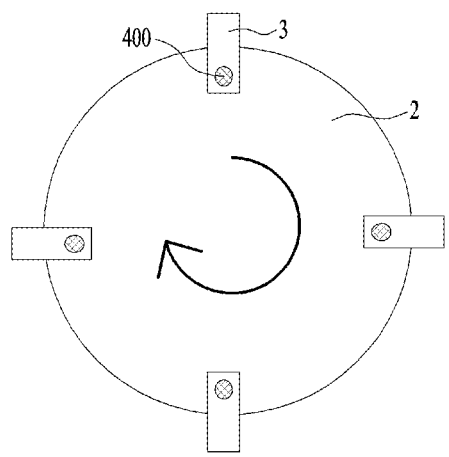

Referring to FIGS. 2A and 2B, an embodiment in which the blade 3 is extended when the rotatable plate 2 rotates will be described.

According to embodiments, when the rotatable plate 2 is rotated by the driver, the blade 3 may be extended toward the outside of the rotatable plate 2 via a centrifugal force. When the rotation of the rotatable plate 2 is stopped, the blade 3 may be folded toward a center of the rotatable plate 2.

The lawn mower apparatus includes the outer frame 5, such that the blade 3 is extended to the outside of the rotatable plate 2 but is not exposed to the outside in a process of mowing the lawn.

However, when producing initially the apparatus, when replacing the blade, when carrying the apparatus, and when repairing or managing the apparatus, the blade may be exposed to the outside. In the cases as described above, the rotatable plate 2 may rotate while the outer frame 5 is not mounted to the body 4.

Further, even when the outer frame 5 is not mounted to the body 4, the lawn mower apparatus may be turned upside down for repairing the apparatus. In this case, there is a risk that the blade 3 will injure the user when the rotatable plate 2 rotates. Thus, there is a need to mount a protection cover 1 on the blade 3 to prevent the user from being injured.

Figure 3A:
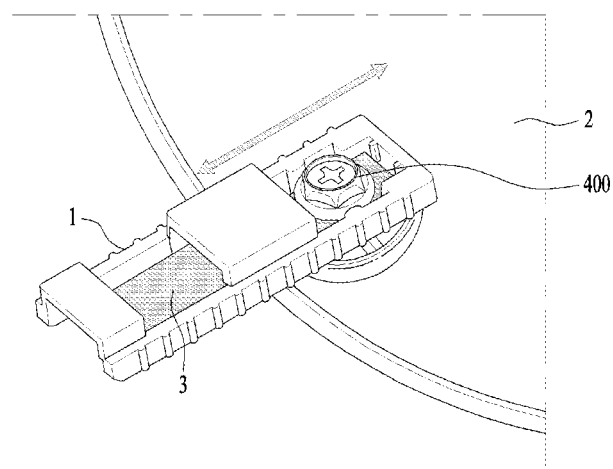
FIGS. 3A and 3B are perspective views showing that a protective cover is slidably coupled to a blade according to the embodiments.
Figure 3B:
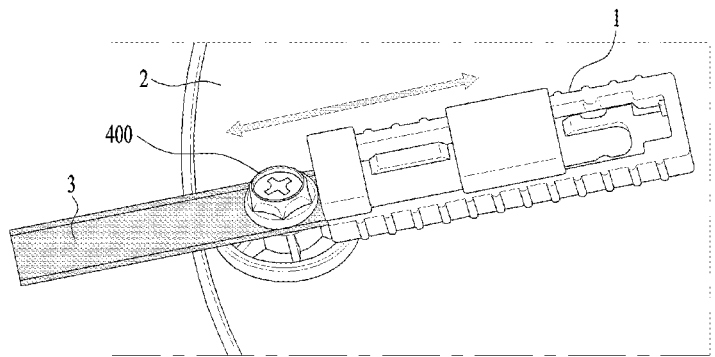

Referring to FIGS. 3A and 3B, a structure in which the protection cover 1 is slidably coupled to the blade 3 will be described.

FIGS. 3A and 3B are perspective views showing that the protection cover 1 is slidably coupled to the blade 3 coupled to the rotatable plate 2. According to embodiments, the protection cover 1 may be coupled to the blade 3 coupled to the rotatable plate 2 and/or to the blade 3 separated from the rotatable plate 2.

In the lawn mower apparatus according to the embodiments, it is not necessary to separate the blade 3 fixed to the rotatable plate 2 from the rotatable plate 2 in order to combine the protection cover 1 with the blade 3.

In the lawn mower apparatus according to the embodiments, it is not necessary to fix the blade 3 separated from the rotatable plate 2 to the rotatable plate 2 in order to combine the protection cover 1 with the blade 3.

Specifically, when the protection cover 1 slides and then is coupled to the blade 3 fixed to the rotatable plate 2 using a screw 400, the protection cover 1 is constructed such that the cover 1 does not cause interference with the screw 400 an/or other structures. The protection cover 1 is constructed such that the protection cover 1 may not interfere with other members until the protection cover 1 fully slides and thus a length-direction end of the blade 3 contacts a third cover 300.

Referring to FIGS. 4A-4C and FIGS. 5A-5B a coupling structure between the protection cover 1 and the blade 3 will be described.

FIG. 4A is a top view showing a configuration of the protection cover 1, a first cover 100, a second cover 200, a third cover 300, and a guide 201.

The blade 3 according to embodiments has a top surface and a bottom surface as exposed to the outside. The protection cover 1 may include the first cover 100 that covers the top and/or bottom surfaces of the blade 3.

Further, the blade 3 may have cutting edges as both edges in a width direction thereof respectively. The protection cover 1 may include the second cover 200 covering the cutting edges as both edges in the width direction of the blade 3. The second cover 200 may be connected to both ends of the first cover 100.

Further, the blade 3 includes a hole defined in one end in a longitudinal direction thereof. The blade 3 may be fixed to the rotatable plate 2 using the screw 400 passing through the hole. The blade 3 may be rotated using a screw shaft 402 as a rotating shaft, while being fixed to the rotatable plate 2.

The protection cover 1 according to the embodiment may include the third cover 300 which covers an edge of a portion of the blade 3 where the hole defined in one end in the longitudinal direction of the blade 3 is located.

FIG. 4B is a top view showing a structure in which the blade 3 is coupled to the protection cover 1 along the guide 201.

The second cover 200 may include the guide 201 that slides along both edges in the width direction of the blade 3. While the both cutting edges of the blade 3 are received in the both guides 201 respectively, the protection cover 1 may be slidably coupled to the blade 3.

When the protection cover 1 fully slides along the blade 3, a portion of the third cover 300 is in contact with one end of the blade 3. At this time, a movement path of the guide 201 may be blocked by the third cover 300 so that the blade 3 may no longer slide.

FIG. 4C is a top view showing a structure in which the protection cover 1 is coupled to the blade 3 coupled to the rotatable plate 2 via the screw 400.

The screw 400 may pass through the hole defined in one end in the longitudinal direction of the blade 3. This allows the blade 3 to be secured to the rotatable plate 2. The blade 3 may be rotated using the screw shaft 402 as a rotating shaft while being fixed to the rotatable plate.

The protection cover 1 according to embodiments may be slidably coupled to the blade 3 fixed to the rotatable plate 2.

The first cover 100 according to embodiments may include a first open face 101.

The protection cover 1 may slide as far as possible until one end of the blade 3 is in contact with the third cover 300.

At this time, the first cover 100 of the protection cover 1 may include the first open face 101 exposing the hole of the blade 3.

Further, when the blade 3 is coupled to the rotatable plate 2, the first cover 100 of the protection cover 1 may include the first open face 101 exposing the screw 400 coupled to the blade 3.

The first cover 100 according to embodiments may include a second open face 102.

The protection cover 1 may slide as far as possible until one end of the blade 3 is in contact with the third cover 300. At this time, the hole may be located at one end of the blade 3, and the first cover 100 may include the second open face 102 exposing the other end of the blade 3.

Further, when the blade 3 is coupled to the rotatable plate 2, the screw 400 may pass through one end of the blade 3. At this time, the first cover 100 may include the second open face 102 exposing the other end of blade 3.

Figure 5A:
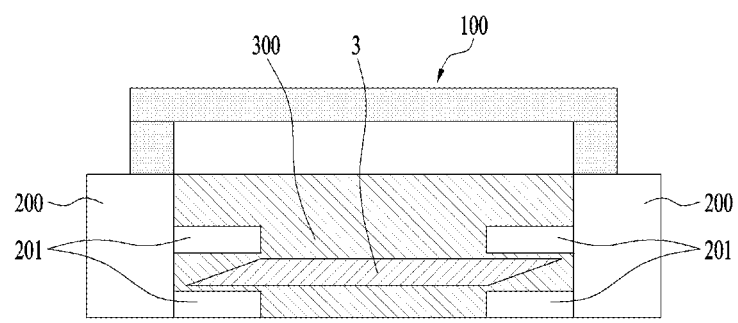

FIG. 5A is a cross-sectional view showing a structure in which the protection cover 1 covers the blade 3 in a state when the blade is not coupled to the rotatable plate 2.

The blade 3 according to the embodiments may have a cross section of a parallelogram shape.

The cutting edges as the both ends in the width direction of the blade 3 may be slidably received in the both guides 201, respectively.

Figure 5B:
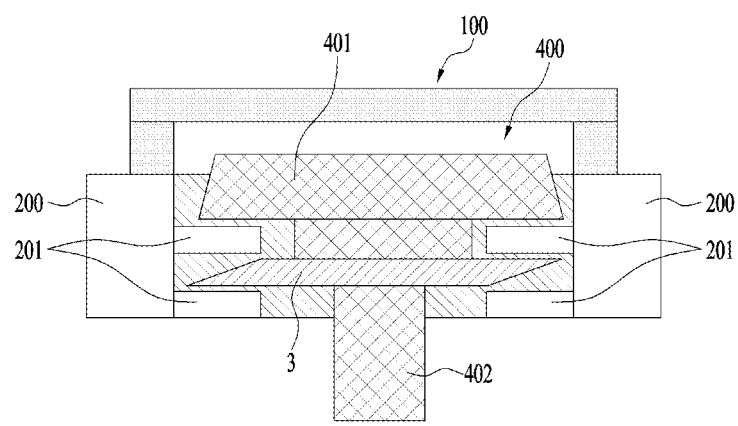

FIG. 5B is a transverse cross-sectional view along a a-a' cut face in FIG. 4C, showing a structure in which protection cover 1 covers the blade 3 coupled to the rotatable plate 2 via the screw 400

The blade 3 according to embodiments may have a cross section of a parallelogram shape. The cutting edges as the both ends in the width direction of the blade 3 may be slidably received in the both guides 201, respectively. Further, the protection cover 1 may slide as far as possible until one end of the blade 3 contacts the third cover 300.

Specifically, in a state in which the protection cover 1 is coupled to the blade 3, a screw head 401 may be located in a space defined between the both guides 201 and the first cover 100. While the protection cover 1 slides as much as possible and is coupled to the blade 3, the screw shaft 402 may pass through the hole of the blade 3 and be connected to the rotatable plate 2. Via the screw 400, the blade 3 may be secured to the rotatable plate 2. At this time, the blade 3 may rotate around the screw shaft 402.

Hereinafter, a structure of the protection cover 1 including a projection 203 will be described with reference to FIGS. 6A-6B.

Figure 6A:
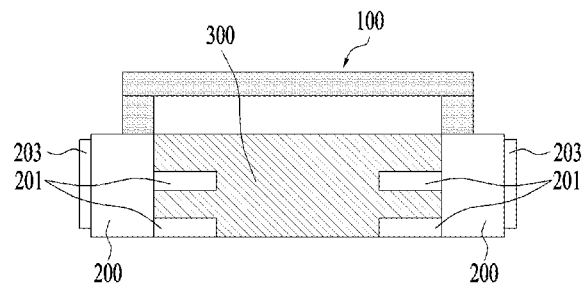
FIGS. 6A and 6B are a top view and a transverse cross-sectional view showing a protection cover with a projection defined in a side face thereof.
Figure 6B:
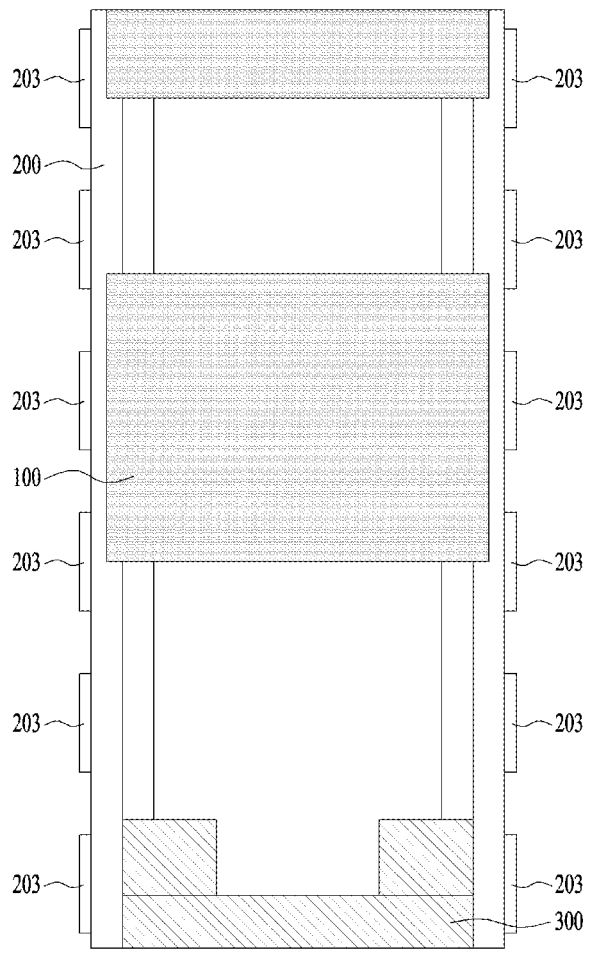

FIG. 6A is a transverse cross-sectional view showing a structure of the protection cover 1 including the projection 203 according to embodiments. On an outer face of the second cover 200 included in the protection cover 1, at least two projections 203 may be arranged along a sliding direction.

The projection 203 may serve to allow a user to grip the protection cover 1 in a reliable manner when the user slides the protection cover 1 on and along the blade 3. Specifically, the projection 203 may cause friction to prevent the user's hand gripping the second cover 200 from sliding. Specifically, the projection 203 may be formed on a portion of the second cover 200 that the user's hand touches. The portion thereof which the user's hand touches may be an outer surface of each of both ends in a width direction of the second cover 200. At least two projections 203 may be arranged on and along the outer surface of each of both ends in the width direction of the second cover 200. In on example, the at least two projections 203 may be arranged in a line along a path where the guide 201 slides on the blade 3.

Further, the projection 203 may be monolithic with the second cover 200. In another example, the projection 203 may be made of a material having a higher frictional force than that of a material forming the second cover 200.

Figure 7A:
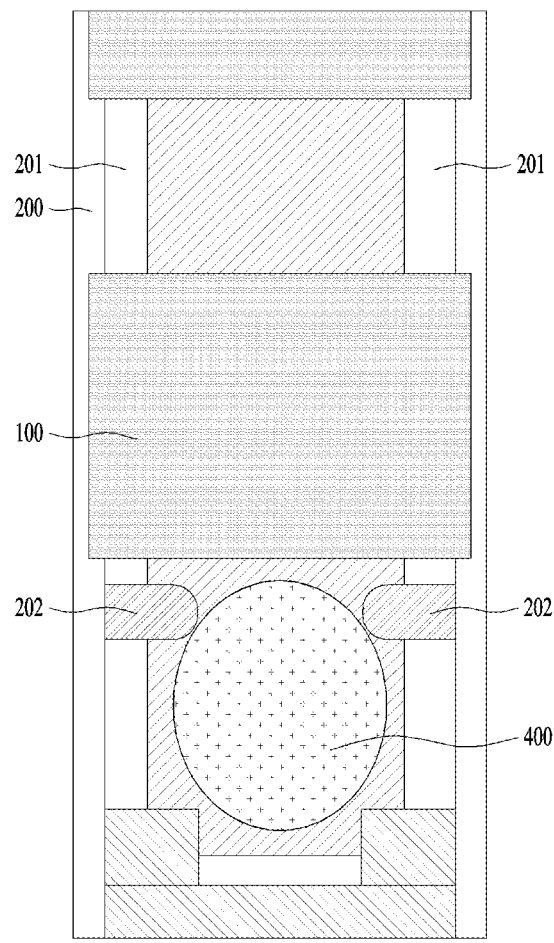
FIGS. 7A and 7B are a top view and a cross-sectional view showing a protection cover having a protrusion.
Figure 7B:
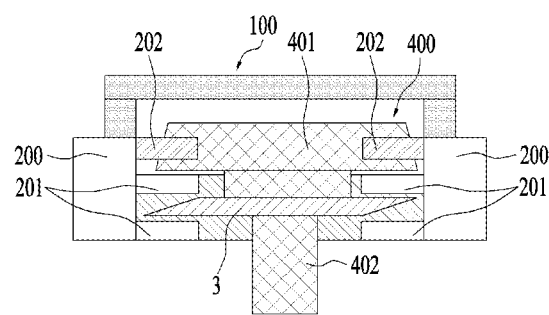

Hereinafter, a structure of the protection cover 1 including a protrusion 202 will be described with reference to FIGS. 7A and 7B.

According to embodiments, the blade 3 may be rotatably coupled to the rotatable plate 2 via the screw 400 passing through one longitudinal end of the blade 3. Further, the blade 3 may be rotated using the screw shaft 402 as a rotating shaft while being coupled to the rotatable plate 2. It may be necessary to mount the protection cover 1 on the blade 3 fixed to the rotating rotatable plate 2. However, when the rotatable plate 2 rotates while the protection cover 1 is mounted, vibration and a centrifugal force are generated. Thus, there is a possibility that the protection cover 1 is removed from the blade 3.

For this reason, the projection engaging with the screw head 401 may be formed on an inner surface of the second cover 200, such that the protection cover 1 may be fixed to the blade 3. This may prevent the protection cover 1 from being removed from the blade 3.

According to embodiments, the second cover 200 may include a pair of protrusions 202 extending from the inner surface thereof. The protrusion 202 may include a pair of protrusions protruding from both inner surfaces of the second cover 200, respectively. The protrusion 202 may be disposed at a midpoint in a height direction between the guide 201 and the first cover 100 and may be engaged with the screw head 401.

When the protection cover 1 fully slides and is coupled to the blade 3, one end in the longitudinal direction of the blade 3 comes into contact with the third cover 300. At this time, one end of the screw head 401 is in contact with the third cover 300, and the other end of the screw head 401 is in contact with the protrusions 202. The screw head 401 is engaged with the protrusions 202 and the third cover 300 to fix the protection cover 1 to the blade 3.

The engaging between the protrusions 202 and the third cover 300 and the screw head 401 may disallow the removal of the protection cover 1 from the blade 3 due to the vibration and/or weak force.

Effects as not described herein may be derived from the above configurations. The relationship between the above-described components may allow a new effect not seen in the conventional approach to be derived.

In addition, embodiments shown in the drawings may be modified and implemented in other forms. The modifications should be regarded as falling within a scope of the present disclosure when the modifications is carried out so as to include a component claimed in the claims or within a scope of an equivalent thereto.

What is claimed is:

1. A blade protection cover configured to be coupled to a blade of a lawn mower apparatus, the blade protection cover comprising:
   a first cover for covering one face of the blade;
   two second covers connected to the first cover, the two second covers for covering two edges of the blade in a width direction of the blade; and
   two guides, wherein each guide of the two guides is disposed on an inner face of a second cover of the two second covers,
   wherein the two guides are configured to guide the blade protection cover to slide along the two edges of the blade in the width direction of the blade,
   wherein the blade is fixed to a rotatable plate of the lawn mower apparatus via a screw passing through one end defined in a longitudinal direction of the blade,
   wherein the blade protection cover further comprises a third cover for covering an edge located on the one end defined in the longitudinal direction of the blade,
   wherein each of the two second covers includes protrusions protruding from the inner face of the second cover, and
   wherein the protrusions and the third cover come into contact with the screw, thereby limiting sliding movement of the blade protection cover.

2. The blade protection cover of claim 1, wherein the blade is rotatably coupled to the rotatable plate via the screw.

3. The blade protection cover of claim 1, wherein each of the two second covers includes projections,
   wherein the projections are arranged on an outer face of each second cover, and
   wherein the projections are arranged along a sliding direction of the blade protection cover.

4. The blade protection cover of claim 1, wherein the first cover has a first open face for exposing the screw securing the blade to the rotation plate, when the blade protection cover covers the blade.

5. The blade protection cover of claim 4, wherein the first cover has a second open face for exposing an other end of the blade in the longitudinal direction of the blade, when the blade protection cover covers the blade.

6. A lawn mower apparatus comprising:
   a body including a driver;
   a rotatable plate connected to the driver and rotatably mounted on one face of the body;
   a blade rotatably connected to an edge of the rotatable plate; and
   a blade protection cover removably coupled to the blade,
   wherein the blade protection cover includes:
     a first cover for covering one face of the blade;
     two second covers connected to the first cover, the two second covers covering two edges of the blade in a width direction of the blade respectively; and
     two guides, wherein each guide of the two guides is disposed on an inner face of a second cover of the two second covers,
   wherein the two guides are configured to guide the blade protection cover to slide along the two edges of the blade in the width direction of the blade,
   wherein the blade is fixed to the rotatable plate via a screw passing through one end defined in a longitudinal direction of the blade,
   wherein the blade protection cover further comprises a third cover for covering an edge located on the one end defined in the longitudinal direction of the blade,
   wherein each of the two second covers includes protrusions protruding from the inner face of the second cover, and
   wherein the protrusions and the third cover come into contact with the screw, thereby limiting sliding movement of the blade protection cover.

7. The lawn mower apparatus of claim 6, wherein the blade is rotatably coupled to the rotatable plate via the screw.

8. The lawn mower apparatus of claim 6, wherein each of the two second covers includes projections,
   wherein the projections are arranged on an outer face of each second cover, and wherein the projections are arranged along a sliding direction of the blade protection cover.

9. The lawn mower apparatus of claim 6, wherein the first cover has a first open face for exposing the screw securing the blade to the rotation plate, when the blade protection cover covers the blade.

10. The lawn mower apparatus of claim 9, wherein the first cover has a second open face for exposing the other end in the longitudinal direction of the blade, when the blade protection cover covers the blade.

* * * * *